United States Patent [19]

Gambardella

[11] Patent Number: 5,551,386
[45] Date of Patent: Sep. 3, 1996

[54] INTAKE SYSTEM FOR V-TYPE ENGINE

[76] Inventor: Bruce C. Gambardella, 199 McNamara Rd., Spring Valley, N.Y. 10977

[21] Appl. No.: 456,144

[22] Filed: May 31, 1995

[51] Int. Cl.$^6$ ........................................... F02M 35/10
[52] U.S. Cl. ................................................ 123/184.35
[58] Field of Search ................ 123/184.36, 184.35, 123/184.48, 184.49, 184.53

[56] References Cited

U.S. PATENT DOCUMENTS

| | | | |
|---|---|---|---|
| 2,916,027 | 12/1956 | Chayne et al. | 123/184.35 |
| 2,947,294 | 6/1957 | Bird et al. | 123/184.35 |
| 4,577,596 | 3/1986 | Senga | 123/184.31 |
| 4,641,610 | 2/1987 | Rutschmann | 123/184.36 |
| 4,741,295 | 5/1988 | Hosoya et al. | 123/568 |
| 4,766,853 | 8/1988 | Iwanami | 123/184.36 |
| 4,809,647 | 3/1989 | Masumoto et al. | 123/184.36 |
| 4,930,468 | 6/1990 | Stockhausen | 123/308 |
| 4,957,071 | 9/1990 | Matsuo et al. | 123/184.36 |
| 4,962,735 | 10/1990 | Andreas | 123/184.31 |
| 5,000,129 | 3/1991 | Fukada et al. | 123/184.36 |
| 5,005,536 | 4/1991 | Suzuki et al. | 123/184.35 |
| 5,063,885 | 11/1991 | Yoshioka | 123/184.34 |

*Primary Examiner*—David A. Okonsky
*Attorney, Agent, or Firm*—Weingram & Zall

[57] ABSTRACT

An inlet manifold system particularly adapted for a "V-8" to "V-16" Type internal combustion engine. Such an engine has a first and a second bank of cylinders, each bank having a plurality of combustion cylinders, the banks being parallel to each other. The manifold includes:

a] a first elongated secondary manifold disposed substantially parallel to and above the first bank of cylinders;

b] a second elongated secondary manifold disposed substantially parallel to and above the second bank of cylinders;

c] a first set of a plurality of substantially parallel, spaced apart, demand runners joined to the first secondary manifold along its length, each demand runner extending from the first secondary manifold to a cylinder in the second bank of cylinders and in fluid connection with the first secondary manifold and the cylinder;

d] a second set of a plurality of substantially parallel, spaced apart, demand runners joined to the second secondary manifold along its length, each demand runner extending from the second secondary manifold to a cylinder in the first bank of cylinders and in fluid connection with the second secondary manifold and the cylinder;

e] a first set of a plurality of substantially parallel, spaced apart, supply runners joined to the first secondary manifold along its length and in fluid connection therewith; and f] a second set of a plurality of substantially parallel, spaced apart, supply runners joined to the second secondary manifold along its length and in fluid connection therewith.

The demand runners and the supply runners are connected to the first and second secondary manifolds such that each pair of adjacent spaced apart demand runners has an supply runner therebetween.

18 Claims, 4 Drawing Sheets

INTAKE SYSTEM FOR V-TYPE ENGINE

BACKGROUND OF THE INVENTION

1. Field of the Invention

This invention relates to fuel injection intake manifold systems. In particular, this invention relates to a manifold system having reduced external dimensions in which sequentially firing cylinders are supplied with sufficient, uniform air flow for uniform and high power output.

2. Description of the Prior Art

The present invention relates to an improvement in the intake manifold structure for a V-Type internal combustion engine. A typical V-Type internal combustion engine has two banks of cylinders, one on the left and one on the right. Typically, to make the engine compact, an intake manifold for distributing air among the respective cylinders is interposed between the left and right cylinder banks. Engine performance can be improved by using the inertia of the intake air entering the engine and minimizing resistance to flow of such intake air. This can be done with an intake manifold with air passages of sufficient lengths and effective areas to optimize the performance of the engine. As engines have decreased in size due to space and weight considerations, difficulties have arisen in maintaining the requisite lengths and effective areas to optimize the engine's performance.

Additionally, fuel injected V-8 engines characteristically fire cylinders sequentially. No matter which firing order is chosen, at least one, and possibly two pairs of adjacent cylinders will always fire sequentially. These sequentially firing cylinders demand air sequentially. A problem exists in providing air to these adjacent sequentially firing cylinders. These cylinders compete for the air supply and "starve" each other. This causes non-uniform flow to the cylinders resulting in non-uniform power output.

Still further, it has been found that having demand runners, tubes, i.e., "ram pipes" draw air from a common plenum chamber with a throttled supply is more beneficial than throttling each demand runner. However, since some cylinders in the engine have intake strokes that overlap the intake strokes of other cylinders, if all of the cylinders are drawing from a common plenum chamber, the charging of one cylinder will interfere with the charging of another cylinder, thereby decreasing the volumetric efficiency and preventing uniform charging. To solve this problem, various types of manifold systems were developed. Such systems however did not resolve or even alleviate the problem.

Additionally, with the decreasing size of automobiles, lower hood line designs and lower frontal areas there is a need for a compact fuel injection manifold having a low hood profile. Many known fuel injection manifolds, to achieve such low hood profile limitations have serviceability problems, i.e., parts are difficult to replace. In particular, to make repairs on the engine the intake manifold must be removed to obtain access to, for example the valve covers or remove the fuel injectors. For example, the standard Ford manifold prevents removal of the valve cover and the injectors. Further, the valve cover cannot be removed until the throttle body and EG valve is removed. To achieve such low profiles, the manifolds and plenums must have sharp turns and curves to provide sufficient length. Such a configuration causes higher pressure drops and decreased flows when compared to higher profile manifolds with "gentler" turns and curves.

Still further, it is known, for example, that it is an advantage to having air demand tubes to the cylinders tapered. This allows for higher and more uniform air flows through the engine. It is also advantageous for today's high RPM engines to have long, i.e., about eighteen inches long, demand runners to the cylinders. Providing such configurations with known manifold systems without having sharp bends is almost impossible and snaking them back and forth across the engine causes high pressure drops and low flows.

Possibly relevant U.S. Pat. Nos. in this area of technology are:

2,916,027 to Chayne et al.
2,947,294 to Bird et al.
4,577,596 to Senga
4,741,295 to Hosoya et al.
4,930,468 to Stockhausen
4,957,071 to Matsuo et al.
4,962,735 to Andreas
5,000,129 to Fukada et al.
5,005,536 to Suzuki et al.
5,063,885 to Yoshioka U.S. Pat. No. 2,916,027 to Chayne, et al. describes an induction system for an internal combustion engine. The system includes longitudinal arms disposed above and parallel to the cylinder blocks. A plurality of substantially identical ram pipes interconnect the arms to the cylinders for supplying a charge thereto. The ram pipes lead from the arm to the opposing bank of cylinders. A filtering device is provided in the central plenum to aid in silencing the acoustic noise developed in a resonant tuned system. There is no teaching or suggestion of balancing the flow between the various ram pipes, other than by adjustment of the volume of the arms (49, 50 of FIG. 2, thereof) from which the ram pipes extend, and adjustment of the volume of the header duct (46 of FIG. 2, thereof).

U.S. Pat. No. 2,947,294 to Bird et al. describes an intake manifold for an internal combustion engine in which the ram pipes are arranged in groups of cylinders (e.g., one group of cylinders 1,4,6 and 7 and another group of cylinders 2,3,5 and 8), with the cylinders in a common group having the least amount of overlapping of the intake strokes. By a careful selection of the cylinders that comprise each group, there is a minimum amount of overlapping of the charging cycle or the intake strokes of the cylinders charged through a common chamber.

U.S. Pat. No. 4,577,596 to Senga describes an intake manifold for a V-Type internal combustion engine with supply tubes in the shape of a horseshoe. Branch tubes are integrally formed with the supply runner to provide communication between the supply runner and the cylinder intake port. Fuel injection nozzle mounting holes are formed in the branch tubes at a point just above each cylinder intake port. This design does not address the issue of adjacent drawing cylinders overlapping on the charging cycle and the problems associated therewith.

U.S. Pat. No. 4,741,295 to Hosoya et al. describes an intake manifold system for a V-Type multiple cylinder engine that can be accommodated within a gap defined between the two cylinder banks of the engine in a highly compact manner. The system does not address the issue of adjacent drawing cylinders overlapping on the charging cycle and the problems associated therewith.

U.S. Pat. No. 4,930,468 to Stockhausen describes an induction system for a multi-cylinder internal combustion engine. This reference does not teach an intake manifold system or address the issue of adjacent drawing cylinders overlapping on the charging cycle and the problems associated therewith.

U.S. Pat. No. 4,957,071 to Matsuo et al. describes an intake system for a V-Type internal combustion engine having two banks of cylinders. The intake system is comprised of two subcollectors disposed above the respective two banks of cylinders and connected with the cylinders in the banks. The main collector is disposed above, and between, the two banks of cylinders and is connected through a throttle with the two sub-collectors. Generally, the system is a cross ram design with a central supply plenum with a single split balance tube connecting the two runner supply plenum. The system does not address the issue of adjacent drawing cylinders overlapping on the charging cycle and the problems associated therewith. Further, the system overhangs both the front and rear of the engine and the valve covers, poorly uses engine compartment space and has poor serviceability.

U.S. Pat. No. 4,962,735 to Andreas describes an intake system for multi-cylinder internal combustion engines. The system has suction pipes that extend in a longitudinal direction and are connected to the intake channel leading toward the intake valve by means of passages of different lengths. The system uses a dual supply plenum. A control element is provided for selectively activating one of the two flow paths. The design is essentially another approach to variable inlet tuning, e.g., sees U.S. Pat. No. 4,930,468 to Stockhousen. Due to the complexity of the system, a great deal of under hood space is utilized and serviceability is poor. This system does not address the issue of adjacent drawing cylinders overlapping on the charging cycle and the problems associated therewith.

U.S. Pat. No. 5,000,129 to Fukada et al. describes an intake system for a V-Type engine having a plurality of cylinders disposed in each of left and right-hand cylinder banks with a central surge tank disposed above the space between the left and right cylinder banks. Left and right surge tanks are respectively disposed above the left and right cylinder banks. Communicating passages connect the central surge tank with the left and right surge tanks, and discrete intake passages connect the left and right surge tanks with the cylinder. At least one of the communicating passages on each side of the central surge tank is disposed between the discrete intake passages on the side of the central surge tank. This system provides an intake system in which the effective volume of the surge tank can be increased without substantially increasing the overall size of the engine. This system does not address the issue of adjacent drawing cylinders overlapping on the charging cycle and the problems associated therewith.

U.S. Pat. No. 5,005,536 to Suzuki et al. describes two embodiments of compact high performance induction systems for V-Type engines that include pairs of plenum chambers that extend over the respective cylinder banks. First pairs of runners extend from an inlet opening in each plenum chamber to an outlet opening that communicates with the cylinder of the opposite bank. Second pairs of intake passages are provided which extend from inlet openings in the respective plenum chambers to outlet openings in the cylinders of the adjacent cylinder head. The first intake passages have portions that extend through the other plenum chambers and the second intake passages communicate with the cylinders through these intermediate portions. The intermediate portions are curved and in one embodiment the second intake passages are tangential to these curved portions and in the other embodiment they are radial to it. Each cylinder of the engine is thus served by both long low speed runners and short high speed runners. This system does not address the issue of adjacent drawing cylinders overlapping on the charging cycle and the problems associated therewith.

U.S. Pat. No. 5,063,885 to Yoshioka describes an improved high efficiency compact induction system for a V-Type internal combustion engine. The system includes a plenum chamber that extends through the center of the engine and a plurality of intake pipes that extend from the intake ports of the cylinders of one of the banks, across the center that enters the plenum chamber adjacent the intake ports of the other cylinder across the center and enter the plenum chamber on the side adjacent the intake ports of the one cylinder bank. The points of entry of the intake pipes with the plenum chamber lie under the other intake pipes to provide adequate length for the intake pipes and maintain a short overall length for the induction system. This system permits packaging long inlet runners by using the space in the center of the banks of cylinders. There would be significant problems in using this system in a "push rod" engine as the cam and push rods use considerable space in such area. This system does not address the issue of adjacent drawing cylinders overlapping on the charging cycle and the problems associated therewith.

The above known systems, to various degrees, provide very poor serviceability, are extremely complex designs and do not address the problem of adjacent demanding cylinders. Further, they allow relatively little space or latitude for demand runner taper. Runner taper greatly enhances cylinder filling, volumetric efficiency, and power output.

OBJECTS AND SUMMARY OF INVENTION

It is an object of this invention to provide a manifold design for a fuel injected engine in which a separate air supply is interspersed between cylinders that are firing and demanding air sequentially to eliminate cylinder competition for air.

It is a further object of this invention to provide a compact fuel injection manifold with a low hood profile that can be easily serviced.

It is a more specific object of this invention to provide a compact fuel injection manifold in which the intake manifold does not have to be removed to obtain access to, for example, the valve covers or fuel injectors.

It is another object of this invention to provide a manifold configuration that permits relatively long, tapered air demand runners to the cylinders to provide higher and more uniform air flow through the engine.

It is yet another object of this invention to provide a manifold that allows for variation of demand runner taper or area and is of a size that fits within the overall length and width of the engine compartment and maintains a low hood profile.

All of the afordescribed objects are achieved by the inlet manifold system of this invention. The system is particularly adapted for a "V-8" to "V-16" Type internal combustion engine. Such an engine has a first and a second bank of cylinders, each bank having a plurality of combustion cylinders, the banks being parallel to each other. The manifold comprises:

a] a first elongated secondary manifold disposed substantially parallel to and above the first bank of cylinders;

b] a second elongated secondary manifold disposed substantially parallel to and above the second bank of cylinders;

c] a first set of a plurality of substantially parallel, spaced apart, demand runners joined to the first secondary manifold along its length, each demand runner extending from the first secondary manifold to a cylinder in the second bank of cylinders and in fluid connection with the first secondary manifold and the cylinder;

d] a second set of a plurality of substantially parallel, spaced apart, demand runners joined to the second secondary manifold along its length, each demand runner extending from the second secondary manifold to a cylinder in the first bank of cylinders and in fluid connection with the second secondary manifold and the cylinder;

e] a first set of a plurality of substantially parallel, spaced apart, supply runners joined to the first secondary manifold along its length and in fluid connection therewith; and f] a second set of a plurality of substantially parallel, spaced apart, supply runners joined to the second secondary manifold along its length and in fluid connection therewith.

The demand runners and the supply runners are connected to the first and second secondary manifolds such that each pair of adjacent spaced apart demand runners has a supply runner therebetween.

Preferably, the demand runners and the supply runners are connected to the first and second secondary manifolds such that each pair of adjacent spaced apart supply runners has a demand runner therebetween.

In a preferred embodiment, a primary manifold is disposed between and parallel to the first and second secondary manifolds and in fluid connection with each set of supply runners. The supply runners extend from the primary manifold and are substantially perpendicular thereto. The primary manifold has an air inlet port at one end thereof, i.e., the front of the automobile, with a throttle thereon.

The manifold of this invention distributes air to the cylinders of a V-8 to V-16 engine in an efficient manner. The air is channeled down through the center of the engine through a central chamber, i.e., the primary manifold. When air is drawn by a cylinder in a bank, the air flow is pulled from two different "runners" or channels, i.e., the demand runner and a supply runner, thus enhancing the flow of air and minimizing competition for air from adjacent cylinders. The plenum, manifolds, and runners, are configured to form a low profile that provides easy access for servicing.

BRIEF DESCRIPTION OF THE DRAWINGS

Other important objects and features of the invention will be apparent from the following Detailed Description of the Invention taken with the accompanying drawings in which.

DETAILED DESCRIPTION OF THE INVENTION

Figure 1:
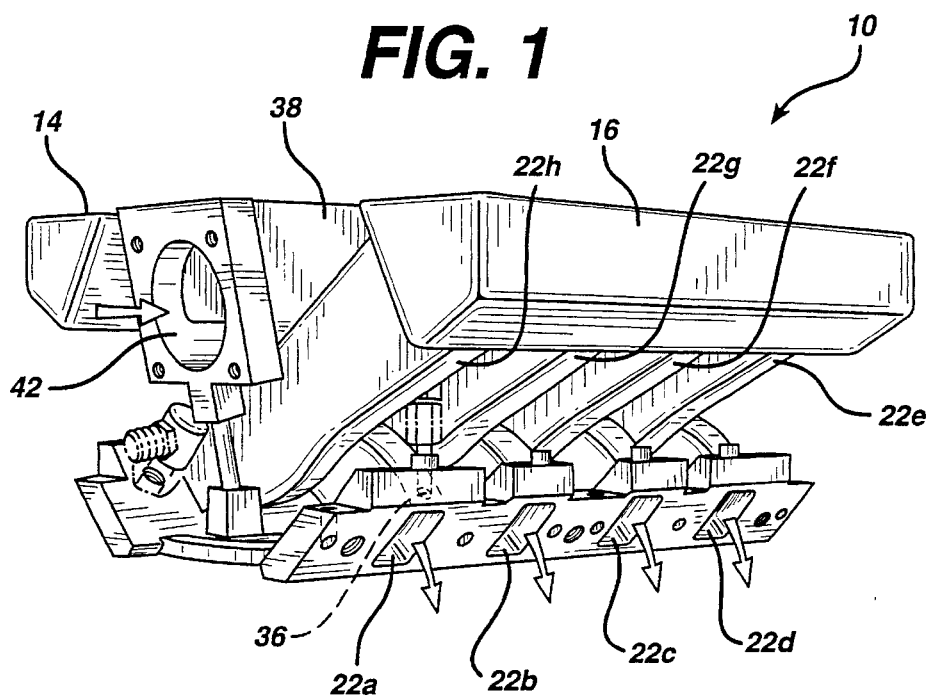
FIG. 1 is a front-side perspective of an embodiment of the manifold of this invention.
Figure 2:
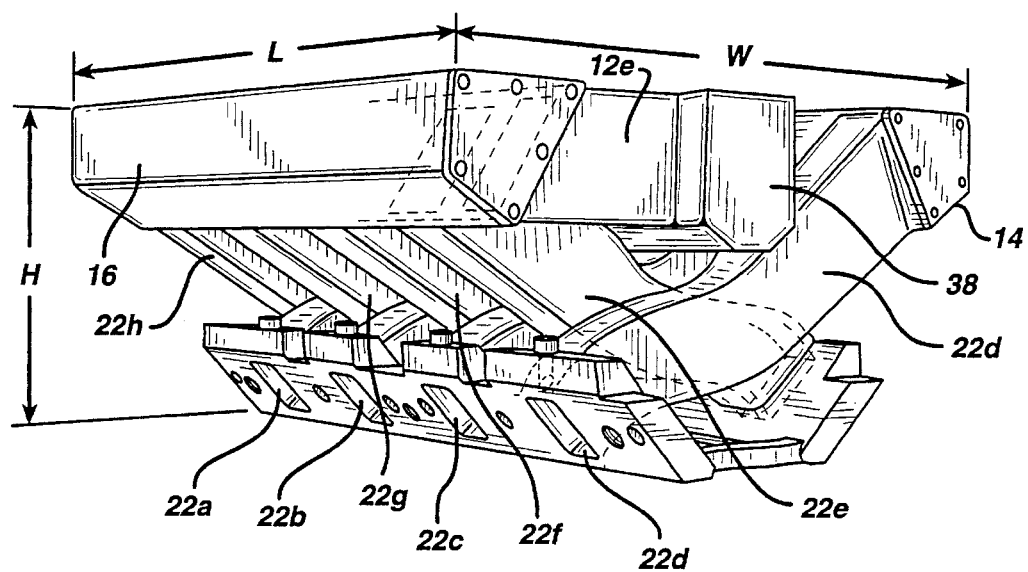
FIG. 2 is a rear-side perspective of the embodiment of the manifold depicted in FIG. 1.

Referring to the drawings in ,ore detail, the manifold 10 of this invention is used with a multicylinder combustion engine 40. The inlet manifold system of this invention 10 may be used on any type engine, but is particularly adapted for a "V-8" to "V-16" Type internal combustion engine 40. Such an engine 40 has a first bank 18 and a second bank 20 of a plurality of combustion cylinders 26. The banks 18, 20 are substantially parallel to each other.

Figure 3:
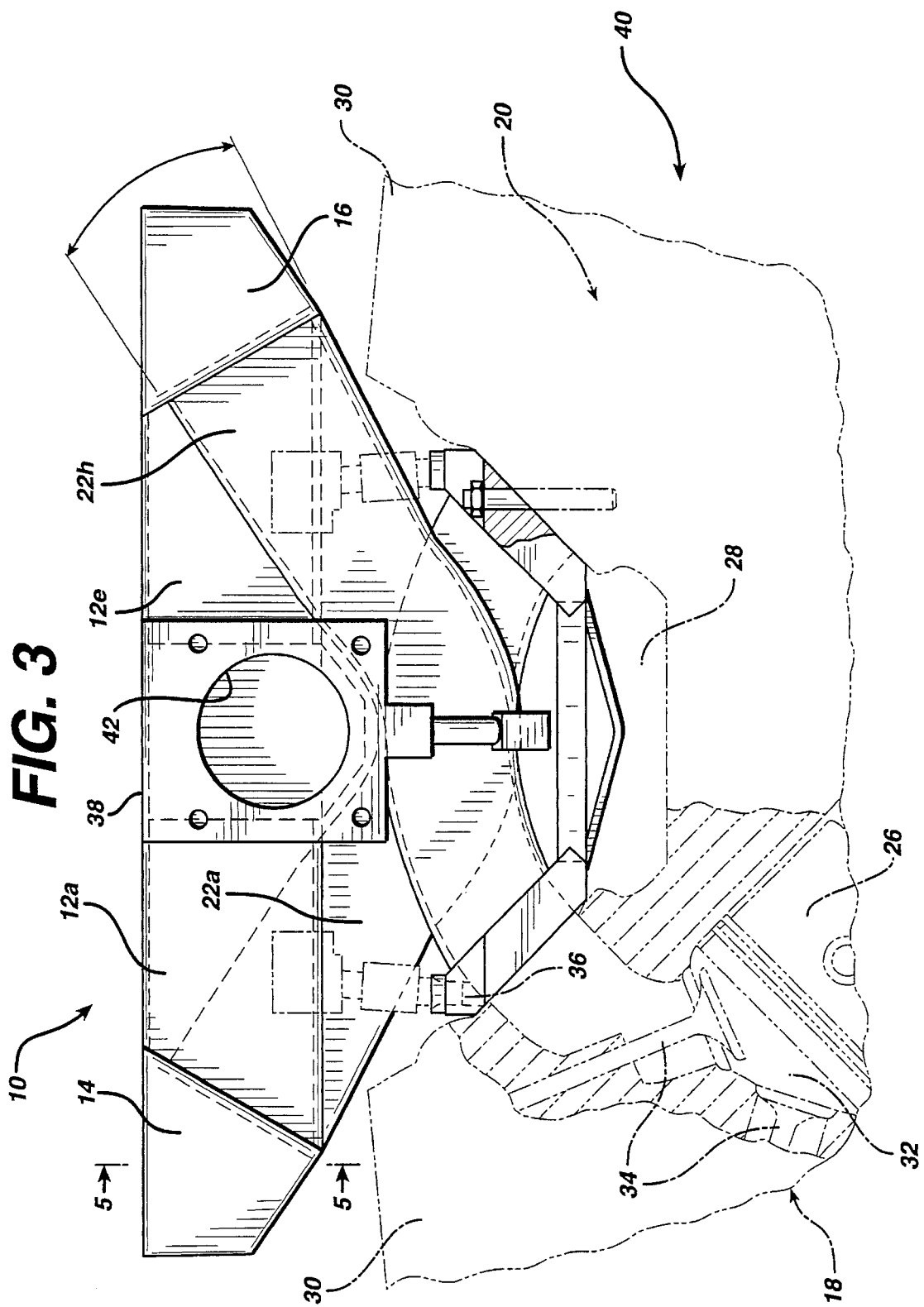
FIG. 3 is a front view of the embodiment of the manifold depicted in FIG. 1 showing it mounted to an engine.

Referring to FIG. 3, the engine 40 includes a cylinder block 24 having a pair of angularly disposed banks 18, 20 of cylinders 26 with an upwardly opening space 28 therebetween. Separate cylinder heads 30 are secured to each cylinder bank 18,20 to close the upper ends of the cylinders 26. These heads 30 include cavities therein positioned to register with the ends of the cylinders to form combustion chambers 32. Intake valves 34 control the admission of the gasoline charge into the combustion chambers 32.

To form a combustible charge of air and fuel, a fuel injection system of the type that is well known in the art is used. Such a system is responsive to the amount of air flowing into the engine and is adapted to inject metered fuel into the air by means of fuel injection nozzles 36 (*a–h*) located at the ends of the demand runners 22 and aimed at intake valves 34. The manifold system of this invention is particularly adapted to a fuel injection system vis-a-vis a carbureted system.

A first elongated secondary manifold or plenum 14 is disposed above and substantially parallel to the first bank 18 of cylinders. A second elongated secondary manifold or plenum 16 is disposed above and substantially parallel to and above the second bank 20 of cylinders. The secondary manifolds 14, 16 are preferably hollowsplenum chambers that permit the unobstructed flow of air and are of equal size and volume.

Figure 4:
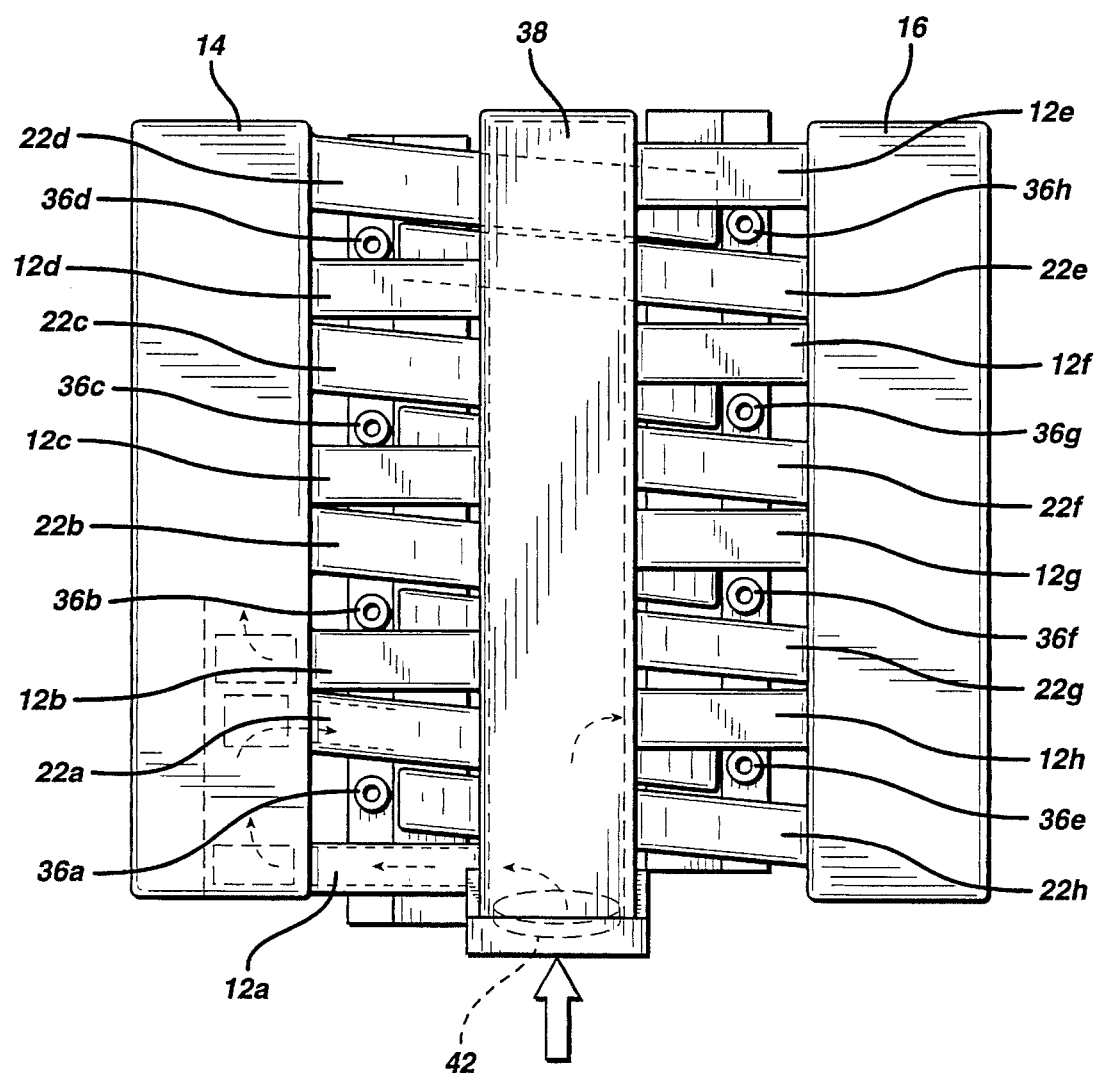
FIG. 4 is a top view of the embodiment of the manifold depicted in FIG. 1.

Referring to FIGS. 1–4, and in particular FIG. 4, a first set of a plurality of substantially parallel, spaced apart, demand runners 22 (*a–d*) are joined to the first secondary manifold 14 along its length. A second set of a plurality of substantially parallel, spaced apart, demand runners 22 (*e–h*) are joined to the second secondary manifold 16 along its length. Each demand runner 22 (*a–h*) extends from its respective secondary manifold 14,16 to a cylinder in the bank 18,20 opposite the secondary manifold 14,16 from which it extends. The demand runners 22 have unobstructed passages and are in fluid connection with its respective secondary manifold 14,16 and cylinder 26. Eight demand runners 22 are shown. However, any number can be provided depending on the type engine.

It is desirable that all these demand runners, i.e. ram pipes 22 (*a–h*) be substantially identical to insure uniformity in charging the cylinders 26. It has been found that by shaping the demand runners 22 as shown in FIGS. 1–4, the column of air moving through each demand runner 22 acquires considerable momentum causing the air to ram into the cylinders 26. Specifically, the demand runners are each rectangular tubes having oblong rectangular cross sections with the height substantially greater than the width and tapering along the length of the tube from the wider connection point at the plenum end of the tube to the small connection point at the cylinder end of the tube. Each of the rectangular tubes forming the demand runners is uniformly tapered along its length as shown by the angle designation in FIG. 3. Further, each of the demand runners 22 A-H is relatively straight so that a clear line of sight exists from the plenum end of the demand runner to the intake valve port end of the demand runner.

In addition, it has been found that the length of the demand runners 22 may be tuned to the timing of the intake valves 34 during at least one engine operating condition. When this phenomenon occurs there will be a further increase in the ram effect that will materially add to the charging of the cylinders 26.

The volume of the secondary manifolds or plenums 14,16 should be large enough so that air resistance is reduced. The secondary manifolds 14,16 should also be sized to prevent favoring the flow of air into one demand runner to the detriment of another runner. This however is not as critical as in prior art designs due to the nature of this invention.

Figure 5:
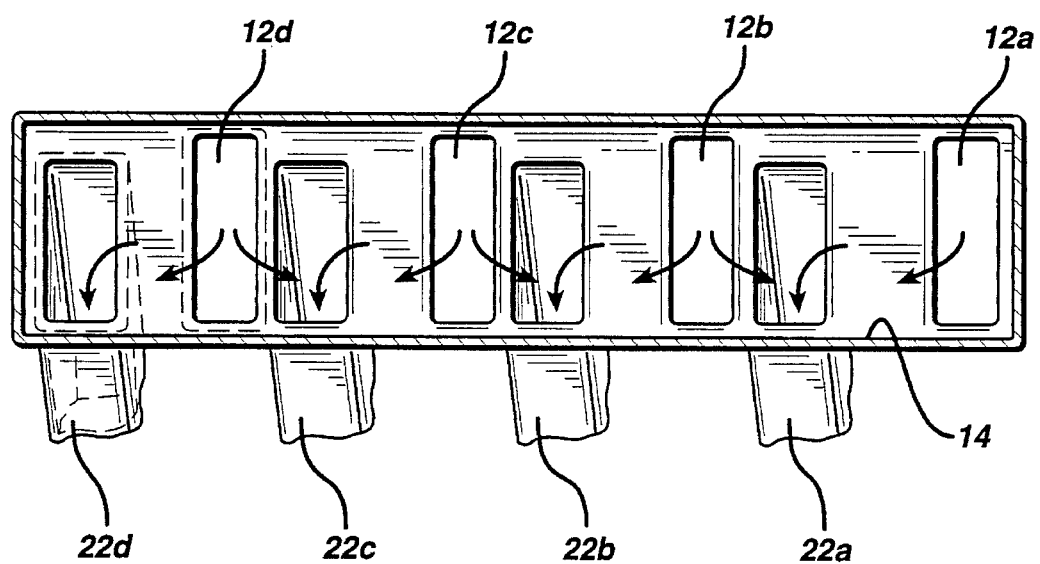
FIG. 5 is a sectional view of the manifold of this invention taken along 5—5 of FIG. 3.

Referring to the Figures, and in particular FIGS. 4 and 5, a first set of a plurality of substantially parallel, spaced apart, supply runners or tubes 12(a–d) are provided. These runners 12(a–d) are joined to the first secondary manifold 14 along its length. These runners 12(a–d) are in unobstructed fluid connection with the first secondary manifold 14. A second set of a plurality of substantially parallel, spaced apart, supply runners or tubes 12(e–h) are provided. These runners 12(e–h) are joined to the second secondary manifold 16 along its length. These runners 12(e–h) are in unobstructed fluid connection with the second secondary manifold 16. As seen from the drawings, the supply runners are shaped similarly to the demand runners, namely rectangular tubes having oblong cross sections with the height substantially greater than the width. Unlike the demand runners, the supply runners are not tapered.

The supply runners 12 (a–h) are substantially perpendicular to the secondary manifolds 14,16. Preferably, the demand runners 22 (a–h) and the supply runners 12 (a–h) are connected to the first and second secondary manifolds 14,16 such that each pair of adjacent spaced apart supply runners 12 (a–h) has a demand runner 22 (a–h) therebetween.

Referring to FIGS. 4 and 5, the demand runners 22 (a–h) and the supply runners 12 (a–h) are connected to the first secondary manifold 14 and the second secondary manifold 16 such that each pair of adjacent spaced apart demand runners 22 (a–h) has a supply runner 12 (a–h) therebetween. For example, supply runner 12a is between demand runners 22a and 22b, supply runner 12b is between demand runners 22b and 22c, supply runner 12c is between demand runners 22c and 22d, supply runner 12e is between demand runners 22e and 22f, supply runner 12f is between demand runners 22f and 22g. Supply runners 12d and 12e are the end supply runners, 12d being at the rear end of the engine 40 and 12e at the front end of the engine 40.

For example, in an engine 40 of the type shown herein there may be two basic firing orders: (1) a six-five firing, where cylinder six (which is charged through demand runner 22b) and cylinder five, (which is supplied by demand runner 22a) are firing sequentially; and (2) three-four firing, where cylinder three (which is charged through demand runner 22g) and cylinder four, (which is supplied by demand runner 22h) are firing sequentially. This invention provides a supply runner 12a and 12g, respectively, between these two sets of demand runners, i.e., 22a, 22b and 22g and 22h. Because there is an additional supply of air provided through, for example 12a and 12g, each cylinder, though they are firing sequentially, receives an adequate supply of air.

Referring to FIGS. 1–4, a primary plenum or manifold 38 is provided which is disposed between and parallel to the first and second secondary manifolds 14,16. The primary manifold 38 is in unobstructed fluid connection with each set of supply runners 12 (a–h) which in turn are in unobstructed fluid connection with the first and second secondary manifolds 14,16.

The primary manifold 38 is provided with a centrally located main inlet 42 to which a throttle (not shown) is added. Although this is a preferred embodiment, for example for a Ford type product, optionally the main inlet may be on one side or the other side of the manifold 10, i.e., a secondary manifold is provided with such main inlet. Such a configuration eliminates the need for the primary manifold 38. To provide an air charge to the bank of cylinders on the opposite side of the engine on which the side mounted main inlet is, the supply runners 12 are extended from one secondary manifold to an appropriate location (i.e., between the demand runners)on the opposed secondary manifold to provide an unobstructed fluid connection therebetween. This embodiment is not shown in the Figures. In effect, the manifold system of this invention permits the location of the main inlet to be at any desirable location, e.g., sides, front or back.

It has also been found that the space 28 between the banks of cylinders 18,20 acts as an atmospheric inlet that allows cool air to enter and circulate through the various parts of the manifold 10. This air will thus form an insulating envelope that will be effective to eliminate the transfer of heat from the engine to the manifold substantially. As a result, this prevents heating of the gasoline charge and further improves the volumetric efficiency of the system.

A primary advantage this invention is that the configuration enables the manifold 10 to provide a performance enhancement normally associated with a large, bulky manifold, such as the manifold shown in U.S. Pat. No. 5,000,129 to Fukada et al., while still being able to be housed within the engine compartment of a modern automobile. The trend in modern automobiles is to provide a low hood profile, thereby reducing wind resistance and improving performance.

Additionally, the configuration of the manifold 10 of this invention allows for easy access to the critical parts of the engine without having to remove the manifold. The manifold 10 accomplishes this by means of a unique structure. In particular, in the preferred embodiment depicted, the first and second secondary manifolds 14,16 are not positioned in a vertical plane above the banks 18,20 of cylinders but are positioned at a location further from the center line of the engine 40. The primary manifold 38 is substantially at the same level of the secondary manifolds 14,16. This enables the primary manifold 38 to be connected to the secondary manifolds or plenums 14,16 by means of horizontal supply runners 12 which are spaced sufficiently far apart to allow access directly down through the spaces between the supply runners 12 and demand runners 22 to provide easy access to the injector nozzles 36 and the spark plugs for each cylinder bank. Specifically because of the oblong rectangular cross section of the supply and demand runners they can be spaced relatively far apart. Additionally, because of this spacing it is possible to angle adjacent pairs of supply and demand runners to provide augmented spacing between the adjacent pairs and thereby provide a clear vertical access path. Accordingly, as seen in FIG. 4 the supply runners 12 A through H are positioned perpendicular to the manifold 38 and plenums 14 and 16, while the demand runners 22 A through H are angled in parallel relationship to each other. Therefore, adjacent pairs of supply and demand runners 12 A and 22 A; 12B and 22B; etc. have extremely wide or augmented spacing at the connection with the plenums as seen clearly in FIG. 5. This augmented spacing allows clear and easy access from above the manifold down to the cylinder banks below the manifold.

For example, referring to FIG. 4, the location of the fuel injection nozzles 36 at the ends of the demand runners 22 insures, due to the configuration of the manifold 10, easy access to the nozzles 36 from the top or side of the manifold 10. This is due to the fact that the nozzles 36 are in a location between a demand runner 22 and a supply runner 12. For example, referring to FIG. 4, nozzle 36a is at the end of demand runner 22h and between supply runner 12a and demand runner nozzle 36b is at the end of demand runner 22g and between supply runner 12b and demand runner 22b, nozzle 36c is at the end of demand runner 22f and between supply runner 12c and demand runner 22c, etc.

Further, the horizontal disposition of the supply runners 12 permits the top of the manifold to present a clean, horizontal plane. As can be seen, substantially all of the prior art references require the central manifold to be elevated above the secondary manifolds or secondary manifolds, thus raising the hood line and adding complexity to the manufacturing process by which the manifolds are made.

The manifold 10 of this invention can be made relatively cheaply and is relatively durable because of this simple construction. There are no moving parts, there are no hoses, there are no tubes. The manifold 10 is in effect a rigid body which is placed directly on top of the engine 40. Accordingly, because of the simplicity, the manifold 10 is suitable for retrofitting onto existing engines without fear of exceeding the space envelope requirements normally associated with the engine. This is a surprising and unexpected benefit of this invention which is the direct result of placing the secondary manifolds 14,16 beyond the vertical projection of the cylinder banks 18,20 to obtain an adequately long run for the demand runners 22 from secondary manifolds 14,16 to the cylinders.

In summary, the manifold system 10 of this invention allows air to be supplied to the demand runners 22 in such a fashion that adjacent sequential demanding cylinders, e.g., in a V8 engine cylinders three and four or five and six are isolated from each others air flow demand by balance tubes, i.e., supply runners 12 between the demand runners 22 to the cylinders. The plenums or secondary manifolds 14,16 on either side of the engine 40 also isolate sequential demanding cylinders.

The manifold system 10 of this invention has numerous advantages, in particular:

(A) Allows for large, straight demand runners 22 that enhance air flow.

(B) Isolation of engine heat from the manifold 10.

(C) A low hood profile.

(D) Access to fuel injectors 36 without removal of any other component, directly from above, so you can remove any injector and change it without removing anything else.

(E) Removal of the engine valve covers with easy removal of the manifold 10, e.g., just pull the whole manifold right off by removing a couple of bolts and a gasket.

(F) The size of the manifold does not exceed the width or length of the engine allowing for better utilization of limited under hoodspace.

(G) The manifold inherently produces very uniform demand runners 22 allowing for more uniform air/fuel mixture control and lower engine emissions.

(H) The system permits wide latitude in terms of variation of inlet and demand runner lengths, demand runner area and taper which increases the ability of the engine designer to increase volumetric efficiency and horsepower output.

(I) The system allows normally unused space in the vicinity of the valve covers to be used to extend the length of the supply runners to improve engine torque characteristics.

(J) The system allows for isolation of the engine coolant from the manifold to improve charge density.

(K) The system allows a single throttle body to be used to supply both plenum secondary manifolds 14,16 or either side of the engine while maintaining uniform air supply to each plenum, thereby increasing engine output and lowering emissions. For example, an engine that is limited to low 400 horsepower can be increased to 600–700 horsepower.

(L) The system's single air inlet also reduces overall cost as a single mass air meter used in current electronic fuel injection designs can be used.

(M) The system can be manufactured relatively inexpensively by, for example, by the lost metal plastic molding process or by casting and fabrication.

Modifications of the foregoing may be made without departing from the spirit and scope of the invention. What is desired to be protected by Letters Patents is set forth in the appended claims.

What is claimed is:

1. An inlet manifold system for a "V" Type internal combustion engine having a first and a second bank of cylinders, each bank having a plurality of combustion cylinders, the manifold comprising:

a] a first elongated secondary plenum disposed substantially parallel to and above the first bank of cylinders;

b] a second elongated secondary plenum disposed substantially parallel to and above the second bank of cylinders;

c] a first set of a plurality of parallel, spaced apart, demand runners joined to the first secondary plenum along its length, each demand runner extending from the first secondary plenum to a respective cylinder in the second bank of cylinders and in fluid connection therewith;

d] a second set of a plurality of parallel, spaced apart, demand runners joined to the second secondary plenum along its length, each demand runner extending from the second secondary plenum to a respective cylinder in the first bank of cylinders and in fluid connection therewith;

e] a first set of a plurality of parallel, spaced apart, supply runners joined to the first secondary plenum along its length and in fluid connection therewith;

f] a second set of a plurality of parallel, spaced apart, supply runners joined to the second secondary plenum along its length and in fluid connection therewith;

the demand runners and the supply runners are connected to the first and second secondary plenums such that each pair of adjacent spaced apart demand runners has a supply runner therebetween; and the demand runners and supply runners being sufficiently straight so as to provide a line of sight through each of the runners from end to end.

2. The inlet manifold system of claim 1, further comprising a primary plenum disposed between and parallel to the first and second secondary plenums and in fluid connection with each set of supply runners.

3. The inlet manifold system of claim 1, further comprising a throttle means associated with each supply runner.

4. The inlet manifold system of claim 1, wherein the primary plenum and the first and second secondary plenums are in substantially the same horizontal plane.

5. The inlet manifold system of claim 1, wherein a fuel injection nozzle is located at the end of each demand runner and between adjacent supply and demand runners to provide access to the nozzle between such adjacent runners.

6. The inlet manifold system of claim 2, wherein the supply runners are perpendicular to the primary plenum.

7. The inlet manifold system of claim 2, wherein the primary plenum has an air inlet port at one end thereof.

8. The inlet manifold system of claim 2 wherein each demand runner is tapered along its length from a larger end, to be connected at the plenum, to a smaller end, to be connected at the cylinders.

9. The inlet manifold system of claim 2 wherein each demand runner and each supply runner is formed as a tubular member having a high-oblong cross-section with the height substantially greater than the width to enable spacing between the supply runners and the demand runners when viewed in the vertical plane.

10. The inlet manifold system of claim 2 wherein:
 a] the supply runners are disposed perpendicular to the associated plenums; and
 b] the demand runners are disposed in an angular relationship to the supply runners to enable augmented spacing between associated supply runners and demand runners at the associated connections to plenums.

11. An inlet manifold system for a "V" Type internal combustion engine having a first and a second bank of cylinders, each bank having a plurality of combustion cylinders, the manifold comprising:
 a] a first elongated plenum disposed substantially parallel to and above the first bank of cylinders;
 b] a second elongated plenum disposed substantially parallel to and above the second bank of cylinders;
 c] a first set of a plurality of parallel, spaced apart, demand runners joined to the first plenum along its length, each demand runner extending from the first plenum to a cylinder in the second bank of cylinders and in fluid connection with the first plenum and the cylinder;
 d] a second set of a plurality of parallel, spaced apart, demand runners joined to the second plenum along its length, each demand runner extending from the second secondary manifold to a cylinder in the first bank of cylinders and in fluid connection with the second plenum and the cylinder;
 e] a first set of a plurality of parallel, spaced apart, supply runners joined to the first plenum along its length and in fluid connection therewith;
 f] a second set of a plurality of parallel, spaced apart, supply runners joined to the second plenum along its length and in fluid connection therewith;
 g] the demand runners and the supply runners are connected to the first and second plenums such that each pair of adjacent spaced apart demand runners has a supply runner therebetween; and
 h] at least one of said all the supply runners and said all the demand runners is formed as a tubular member having a high-oblong cross-section with the height substantially greater than the width to enable spacing between the supply runners and the demand runners when viewed in the vertical plane.

12. The inlet manifold system of claim 11 wherein: each demand runner and each supply runner is sufficiently straight so as to provide a line of sight through the runner from end to end.

13. The inlet manifold system of claim 11 wherein: the supply runners are spaced apart and in parallel relation to each other and perpendicular to the associated plenums.

14. The inlet manifold system of claim 11 wherein: the demand runners are spaced apart in parallel relationship with each other and disposed to alternate between the supply runners at the connection to the plenums, and being disposed in an angular relationship to associated supply runners to enable augmented spacing between the supply runners and demand runners at the associated connections to the plenums.

15. The inlet manifold system of claim 11 wherein all the supply runners and all the demand runners are formed as tubular members having a high oblong cross section with the height substantially greater than the width to enable spacing between the supply runners and the demand runners when viewed in the vertical plane.

16. The inlet manifold system of claim 11 wherein the tubular members forming the at least one of said all the supply runners and said all the demand runners has a rectangular cross section with the height substantially greater than the width.

17. An inlet manifold system for a "V" Type internal combustion engine having a first and a second bank of cylinders, each bank having a plurality of combustion cylinders, the manifold comprising:
 a] a first elongated plenum disposed substantially parallel to and above the first bank of cylinders;
 b] a second elongated plenum disposed substantially parallel to and above the second bank of cylinders;
 c] a first set of a plurality of spaced apart, demand runners joined to the first plenum along its length, each demand runner extending from the first plenum to a cylinder in the second bank of cylinders and in fluid connection with the first plenum and the cylinder;
 d] a second set of a plurality of spaced apart, demand runners joined to the second plenum along its length, each demand runner extending from the second secondary manifold to a cylinder in the first bank of cylinders and in fluid connection with the second plenum and the cylinder;
 e] a first set of a plurality of spaced apart, supply runners joined to the first plenum along its length and in fluid connection therewith;
 f] a second set of a plurality of spaced apart, supply runners joined to the second plenum along its length and in fluid connection therewith;
 g] the demand runners and the supply runners are connected to the first and second plenums such that each pair of adjacent spaced apart demand runners has a supply runner therebetween;
 h] at least one of said all the supply runners and said all the demand runners is formed as a tubular member having a high-oblong cross-section with the height substantially greater than the width to enable spacing between the supply runners and the demand runners when viewed in the vertical plane; and
 i] each demand runner and each supply runner being sufficiently straight so as to provide a line of sight through the runner from end to end.

18. An inlet manifold system for a "V" Type internal combustion engine having a first and a second bank of cylinders, each bank having a plurality of combustion cylinders, the manifold comprising:
 a] a first elongated plenum disposed substantially parallel to and above the first bank of cylinders;
 b] a second elongated plenum disposed substantially parallel to and above the second bank of cylinders;

c] a first set of a plurality of parallel spaced apart, demand runners joined to the first plenum along its length, each demand runner extending from the first plenum to cylinder in the second bank of cylinders and in fluid connection with the first plenum and the cylinder;

d] a second set of a plurality of parallel, spaced apart, demand runners joined to the second plenum along its length, each demand runner extending from the second secondary manifold to a cylinder in the first bank of cylinders and in fluid connection with the second plenum and the cylinder;

e] a first set of a plurality of parallel, spaced apart, supply runners joined to the first plenum along its length and in fluid connection therewith;

f] a second set of a plurality of parallel, spaced apart, supply runners joined to the second plenum along its length and in fluid connection therewith;

g] the demand runners and the supply runners are connected to the first and second plenums such that each pair of adjacent spaced apart demand runners has a supply runner therebetween; and h] each demand runner and each supply runner being sufficiently straight so as to provide a line of sight through the runner from end to end;

i] the supply runners being spaced apart and in parallel relation to each other and perpendicular to the associated plenums;

j] the demand runners are spaced apart in parallel relationship with each other and disposed to alternate between the supply runners at the connection to the plenums, and being disposed in an angular relationship to associated supply runners to enable augmented spacing between the supply runners and demand runners at the associated connections to plenums; and k] all the supply runners and all the demand runners being formed as tubular members having a rectangular cross section with the height substantially greater than the width to enable spacing between the supply runners and the demand runners when viewed in the vertical plane.

* * * * *